US011099297B1

(12) United States Patent
Hurlburt et al.

(10) Patent No.: US 11,099,297 B1
(45) Date of Patent: Aug. 24, 2021

(54) IMAGING SPECTRO-POLARIMETER USING PHOTONIC INTEGRATED CIRCUITS

(71) Applicants: Lockheed Martin Corporation, Bethesda, MD (US); The Regents of the University of California, Oakland, CA (US)

(72) Inventors: Neal Eugene Hurlburt, San Jose, CA (US); Samuel Trent Thurman, Arvada, CO (US); Sung-Joo Ben Yoo, Davis, CA (US); Chad Elliott Ogden, Carlsbad, CA (US)

(73) Assignees: Lockhead Martin Corporation, Bethesda, MD (US); The Regents of the University of California, Oakland, CA (US)

( * ) Notice: Subject to any disclaimer, the term of this patent is extended or adjusted under 35 U.S.C. 154(b) by 0 days.

(21) Appl. No.: 16/696,994

(22) Filed: Nov. 26, 2019

(51) Int. Cl.
  *G01W 1/10* (2006.01)
  *G01J 3/26* (2006.01)
  *G01J 3/447* (2006.01)

(52) U.S. Cl.
  CPC .............. *G01W 1/10* (2013.01); *G01J 3/26* (2013.01); *G01J 3/447* (2013.01)

(58) Field of Classification Search
  None
  See application file for complete search history.

(56) References Cited

U.S. PATENT DOCUMENTS

| 8,913,859 | B1* | 12/2014 | Duncan | G02B 27/50 |
| | | | | 385/33 |
| 10,012,827 | B1* | 7/2018 | Duncan | G01B 9/02051 |
| 10,302,409 | B1* | 5/2019 | Duncan | G01B 9/02051 |
| 10,663,282 | B1* | 5/2020 | Ogden | G01B 9/02043 |
| 10,816,723 | B2* | 10/2020 | Doerr | H04B 10/614 |
| 2014/0111804 | A1* | 4/2014 | Maestle | G01J 3/447 |
| | | | | 356/364 |
| 2017/0170909 | A1* | 6/2017 | Yoo | G01C 11/00 |
| 2020/0119813 | A1* | 4/2020 | Zhang | H04J 14/06 |
| 2020/0209480 | A1* | 7/2020 | Rickman | G06E 3/003 |
| 2020/0280173 | A1* | 9/2020 | Gao | G02B 6/00 |

OTHER PUBLICATIONS

D.D.S. Hale, et al., The Berkeley Infrared Spatial Interferometer: A Heterodyne Stellar Interferometer for the Mid-Infrared, The Astrophysical Journal, 537: 998-1012, Jul. 10, 2000.

* cited by examiner

*Primary Examiner* — Shawn Decenzo
(74) *Attorney, Agent, or Firm* — Morgan, Lewis & Bockius LLP

(57) ABSTRACT

An imaging spectro-polarimetry system includes a polarizer, a tunable laser, a number of optical nodes and an image processing circuit. The polarizer produces polarized light using light received from an object. The tunable laser generates optical local oscillator (LO) signals. Each optical node receives the polarized light and an optical LO signal, performs a heterodyne mixing and generates a digital signal. The image processing circuit receives digital signals from the optical nodes and generates a magnetogram of the object. The polarizer, the tunable laser, the plurality of optical nodes and the image processing circuit are implemented on a photonic integrated circuit (PIC), and the polarized light includes right and left circularly polarized light.

20 Claims, 7 Drawing Sheets

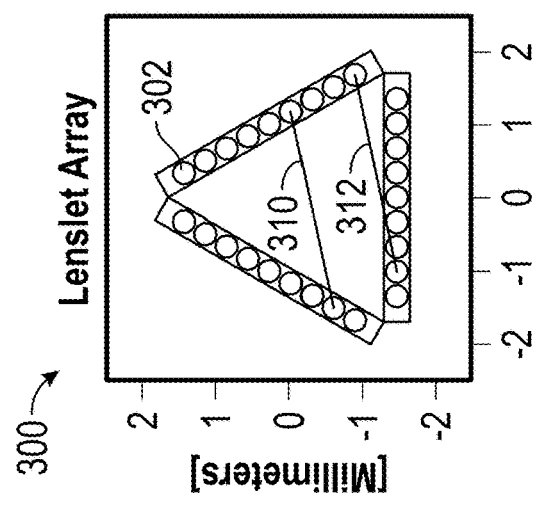
FIG. 3
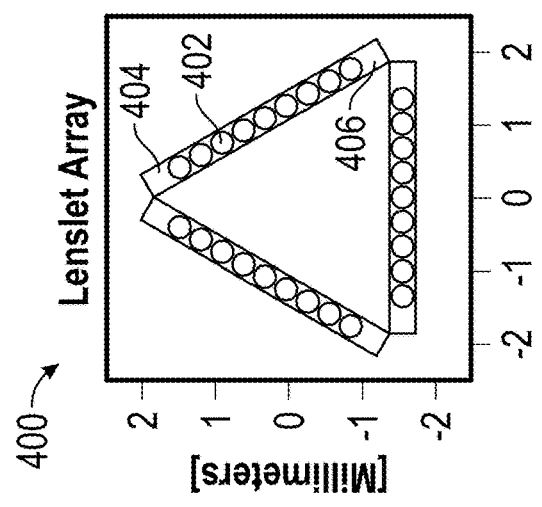
FIG. 4
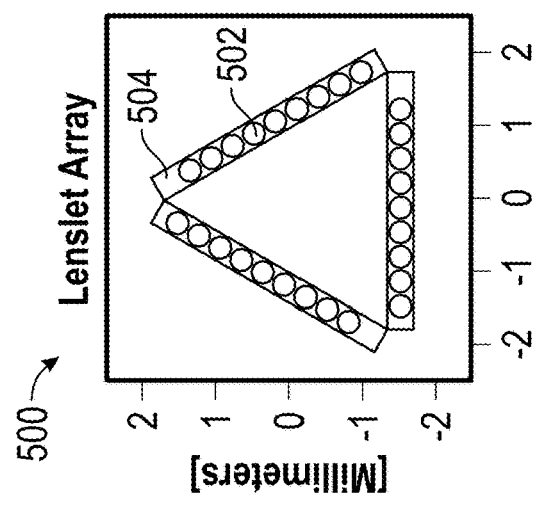
FIG. 5
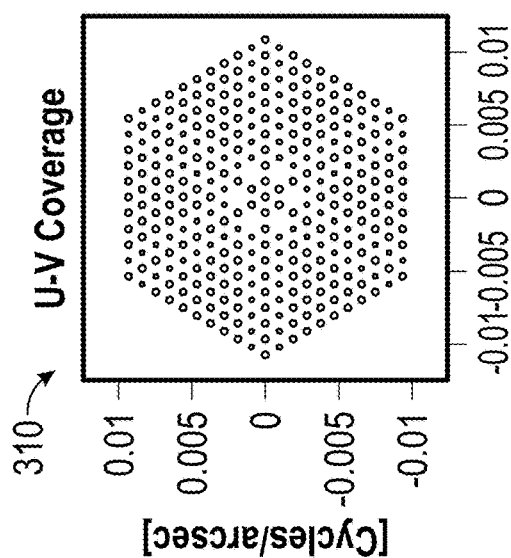
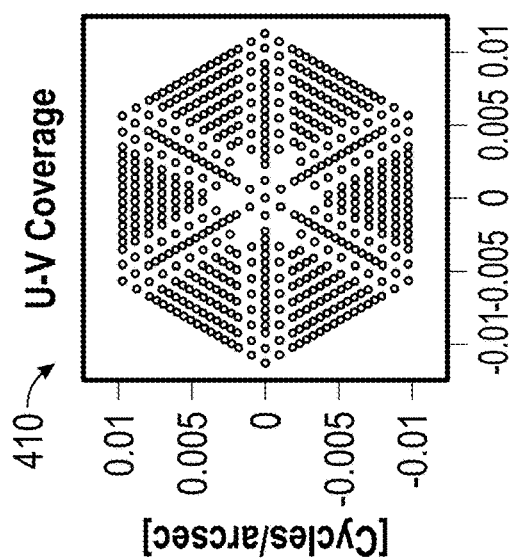
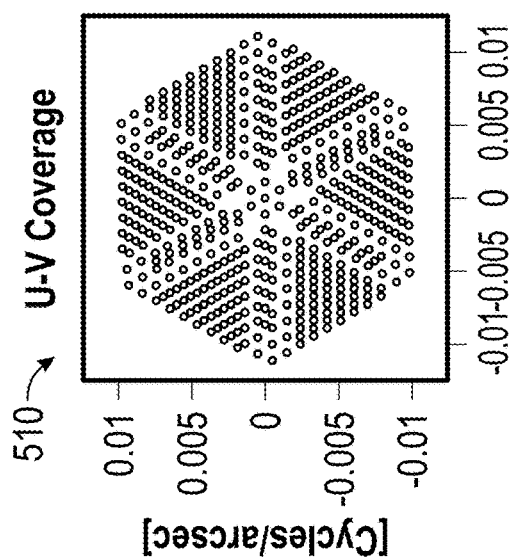

| Magnetogram Imagery Requirements[1] | NOAA Threshold | MICRO |
|---|---|---|
| Spatial Res (arcsec) | ≤5 | 5 |
| Sensitivity (Gauss) | ≤50 | <40 |
| Sampling Frequency | 3 hours | 10 min |

| Optical Assembly Comparison | Today's Compact Magnetograph | MICRO Equivalent |
|---|---|---|
| Aperture | 7 cm | 10 cm |
| Volume | 60 x 40 x 25 $cm^3$ | 10 x 10 x 1 $cm^3$ |
| Mass | 22 kg | 0.2 kg |

IMAGING SPECTRO-POLARIMETER USING PHOTONIC INTEGRATED CIRCUITS

STATEMENT REGARDING FEDERALLY SPONSORED RESEARCH OR DEVELOPMENT

Not applicable.

FIELD OF THE INVENTION

The present invention generally relates to photonic integrated circuits and, more particularly, to an imaging spectro-polarimeter using photonic integrated circuits.

BACKGROUND

Spectro-polarimetry is a key method for measuring chemical composition, fluid motions and magnetic fields through remote-sensing instruments. To be effective these instruments have to resolve individual spectral lines at many positions within an image and precisely measure shifts and splitting of those lines due to both Doppler and Zeeman effects. Magnetogram imagery on and off the Sun-Earth axis are high priorities for space weather operations, for example, as a basis for estimating flare and coronal mass ejection (CME) probabilities, as a boundary condition for coronal and solar wind models and as a key element to tracking and predicting solar cycles. Space weather models use measurements of the solar magnetic field to derive the structure of the corona and predict space weather in the heliosphere. Further, long-term space weather prediction depends on observing the global evolution of the solar magnetic field such as the "butterfly" migration of active regions to the equator and the "rush to the poles" of opposite fields that trigger the next solar cycle.

Existing space-borne magnetographs have large size, weight and power (SWaP) due to housing elaborate optical designs and are high cost due to the exquisite optical engineering needed to meet the design requirements.

SUMMARY

According to various aspects of the subject technology, methods and configuration for providing an imaging spectro-polarimeter using photonic integrated circuits are disclosed. The subject technology uses photonic integrated circuits to create an array of photodetectors that, along with a stable, narrow-band, tunable laser as a local oscillator, are used to measure coherent signals in a narrow spectral band in the infrared or visible ranges.

In one or more aspects, an imaging spectro-polarimetry system includes a polarizer, a tunable laser, a number of optical nodes and an image processing circuit. The polarizer produces polarized light using light received from an object. The tunable laser generates optical local oscillator (LO) signals. Each optical node receives the polarized light and an optical LO signal, performs a heterodyne mixing and generates a digital signal. The image processing circuit receives digital signals from the optical nodes and generates a magnetogram of the object. The plurality of optical nodes including a number of photodiodes are implemented on a photonic integrated circuit (PIC), to record the polarized light, which could include right and left circularly polarized light or linear polarizations.

In other aspects, a method of generating a magnetogram includes configuring a polarizer to produce polarized light using light received from an object, the polarized light including right and left circularly polarized light. The method also includes configuring a tunable laser to generate optical LO signals, and providing a number of optical nodes. Each optical node receives the polarized light and an optical LO signal, performs a heterodyne mixing and generates a digital signal. The method further includes configuring an image processor to receive digital signals from the optical nodes and to generate a magnetogram of the object. In some implementations, the polarizer, the tunable laser, the plurality of optical nodes and the image processor are implemented on a PIC.

In yet other aspects, an imaging spectro-polarimetry PIC includes a polarizer to produce polarized light using light received from an object. The polarized light includes right and left circularly polarized light. A tunable laser can generate optical LO signals. The PIC also includes a number of optical nodes, each of which receives the polarized light from the polarizer and an optical LO signal from the tunable laser, performs a heterodyne mixing, and generates a digital signal. An image processing circuit receives digital signals from the optical nodes and generates a magnetogram of the object.

The foregoing has outlined rather broadly the features of the present disclosure so that the following detailed description can be better understood. Additional features and advantages of the disclosure, which form the subject of the claims, will be described hereinafter.

BRIEF DESCRIPTION OF THE DRAWINGS

For a more complete understanding of the present disclosure and the advantages thereof, reference is now made to the following descriptions to be taken in conjunction with the accompanying drawings describing specific aspects of the disclosure, wherein:

FIG. 3 is a schematic diagram illustrating examples of lenslet arrays and corresponding spatial frequency spectra, according to certain aspects of the disclosure.

FIG. 4 is a schematic diagram illustrating examples of lenslet arrays and corresponding spatial frequency spectra, according to certain aspects of the disclosure.

FIG. 5 is a schematic diagram illustrating examples of lenslet arrays and corresponding spatial frequency spectra, according to certain aspects of the disclosure.

DETAILED DESCRIPTION

Figure 1:
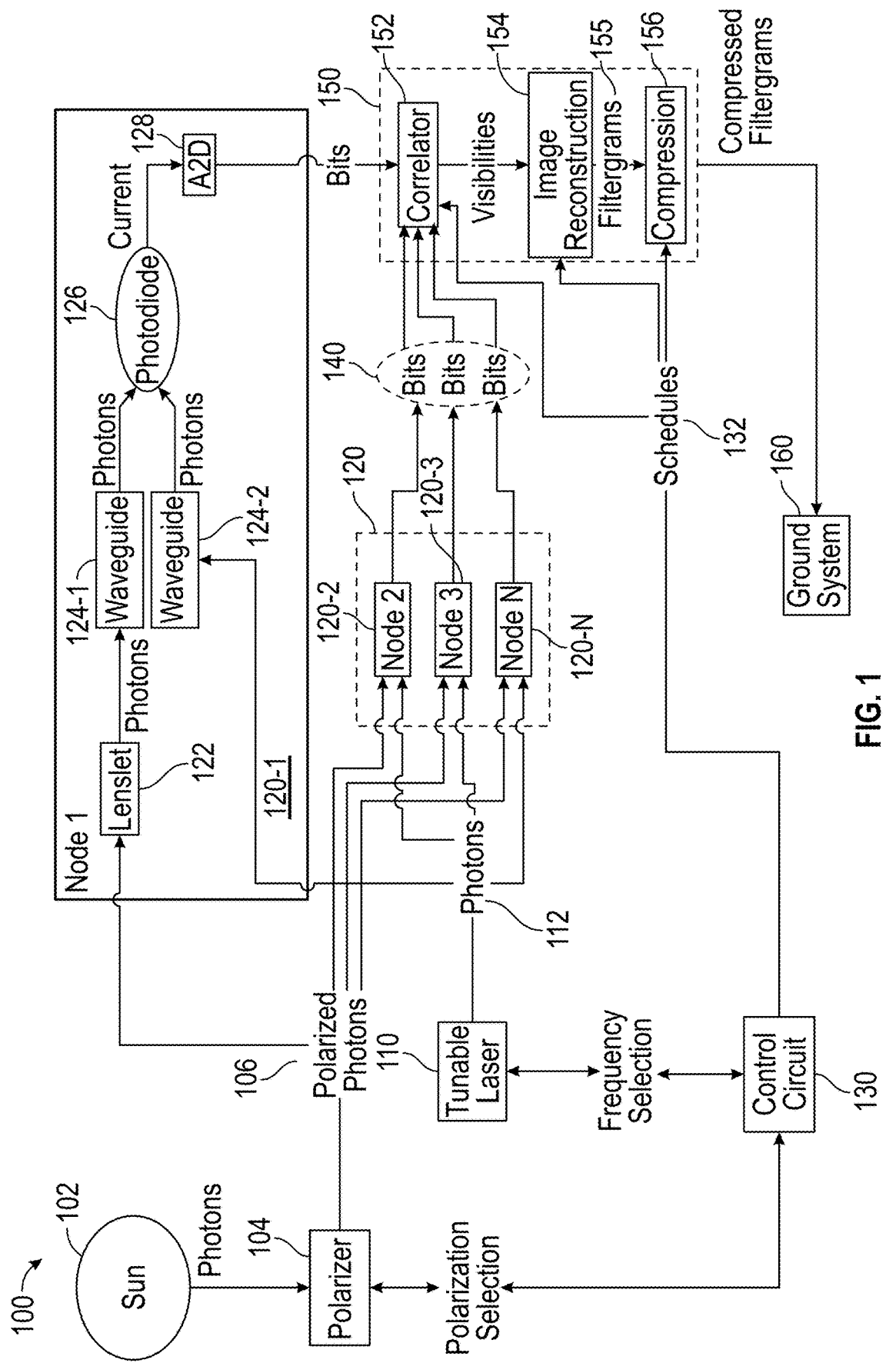
FIG. 1 is a schematic diagram illustrating an example of an imaging spectro-polarimetry system, according to certain aspects of the disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

In some aspects of the present technology, methods and configuration for providing an imaging spectro-polarimeter using photonic integrated circuits (PICs) are disclosed. The imaging spectro-polarimeter of the subject technology leverages PICs to form an array of photodetectors and utilizes a stable, narrow-band tunable laser as a local oscillator. The array of photodetectors are used to measure coherent signals in a narrow spectral band in the infrared or visible ranges. The resulting heterodyned signals are digitized and correlated to create raw visibilities for that particular spectral band. Visibilities for a set of spectral bands and polarizations are assembled and processed to create data products that can be further combined to create magnetograms and dopplergrams, such as images of the magnetic fields and motions of material.

Existing approaches for creating products such as magnetograms and dopplergrams rely on traditional filter designs and imagers. These designs are commonly based on Fabry-Perot or Michaelson interferometers. There have been some attempts at using a heterodyne approach, but these were limited to spectral measurements of point sources rather than images. Further, observations collected by radio arrays use similar processing methods for creating visibilities, but these developments have not been extended into the infrared (IR) or visible range. Existing magnetographs are relatively large compared to the size of their telescope aperture, for example, the optics for the helioseismic and magnetic imager on the Solar Dynamics Observatory is about the size of a large desk but has an aperture of only 14 cm.

The imaging spectro-polarimeter device of the subject technology collapses the volume down to the size of the aperture itself, resulting in a dramatic reduction in size and mass. Traditional optical designs also require extensive and highly precise engineering and assembly, while key elements of the disclosed imaging spectro-polarimeter device can be printed using standard photolithography. The disclosed imaging spectro-polarimeter device also referred to as a magnetograph using interferometric computational-imaging for remote observations (MICRO) device can produce magnetograms, for example, space-based photospheric magnetograms of the full solar disk. The MICRO device allows continuous solar magnetic field measurements using a novel sensor technology with dramatically reduced size, weight and power (SWaP) and cost. The disclosed technology is a compelling application of PICs to space-based imaging.

In some aspects, the disclosed MICRO device can be implemented using a segmented planar imaging detector for electro-optic reconnaissance (SPIDER)-based layout with about hundreds of (e.g., 960) lenslets in a ring of about few centimeters (e.g., 10.3 cm) size operating at a wavelength of about 1564.8 nm. In some implementations, the stokes parameters can be computationally determined to derive magnetograms, and the optics can be collapsed to a single-chip design for a disruptive reduction in SWaP. The MICRO device of the subject technology enables small satellite solutions for measurements on or off the Sun-Earth line, replaces complex assemblies with printable instruments to dramatically reduce cost, and validates technology for other applications.

FIG. 1 is a schematic diagram illustrating an example of an imaging spectro-polarimetry system 100, according to certain aspects of the disclosure. The imaging spectro-polarimetry system 100 (hereinafter "imaging system 100") is an example implementation of the MICRO device of the subject technology and includes a polarizer 104, a tunable laser 110, a number of optical nodes 120 (120-1, 120-2 . . . 120-N) and an image processor (also referred to as an imager processor) 150. The polarizer 104 receives light (photons) from an object 102 (e.g., the sun) and generates a polarized light (photons), including right and left circularly polarized (CP) light. The tunable laser 110 generates optical local oscillator (LO) signals (photons). The wavelength (or frequency) of the LO signals can be controlled by a control circuit 130, which can be part of a PIC that includes the polarizer 104, the tunable laser 110, the optical nodes 120 and the image processor 150. In some implementations, at least part of the functionalities of the controller circuit 130 can be implemented by an external processor or controller that is not part of the PIC. The control circuit 130 can also control polarization selection of the polarizer 104, which can be implemented, for example, by changing rotation angles of quarter waveplates included in the polarizer 104. In some implementations, the polarizer 104 can be an adjustable filter that can be adjusted for selection of one or more polarization by the control circuit 130.

The optical nodes 120 include N (e.g., hundreds such as 960) optical nodes. Each optical node 120 (e.g., 120-1) includes a lenslet 122, a first waveguide 124-1, a second waveguide 124-2, a photodetector (e.g., a photodiode) 126 and an analog-to-digital converter (ADC) 128. The lenslet receives polarized light (photons) 106 selected by the polarizer 104 and directs the received polarized light through the first waveguide 124-1 to the photodetector 126. The photodetector 126 receives the polarized light through the first waveguide 124-1 and an LO signal 112 generated by the tunable laser 110 to perform a heterodyne mixing to generate an optical modulated signal. The ADC 128 converts the optical modulated signal to a digital signal that is an output of the optical node 120-1. The optical nodes 120, as described above, generate a number (N) of digital signals 140 (bits) that are passed to the image processor 150.

The image processor 150 includes a correlator module (e.g., circuit) 152, an image reconstruction module (e.g., circuit) 154 and a compression module (e.g., circuit) 156, each of which can be implemented in hardware, firmware and/or software. The correlator 152 can correlate multiple digital signals from the optical nodes 120 to generate visibilities. It is understood that the digital signals from different optical nodes 120 have phases that are related to the location of each lenslet 122 on an array of lenslets (discussed later). The correlator 152 derive visibilities that are represented by data (signal amplitudes) at various points of a two-dimensional (2D) spatial frequency (U-V) spectrum. The image reconstruction module 154 can form images such as magnetograms (also referred to as filtergrams) of the object 102 (e.g., Sun) based on the visibilities. The compression module 156 compresses the images to reduce data volume for transmission of the filtergram to one or more ground station 160, as the MICRO device can be used onboard a space vehicle (e.g., a satellite). In some implementations, timing (schedules) of the operations of the correlator module 152, the image reconstruction module 154 and the compression module 156 are controlled by the control circuit 130.

In summary, the MICRO device of the subject technology (e.g., the imaging system 100) is based on a PIC imaging interferometry technology of SPIDER. The optical interferometry, used by the MICRO device, eliminates need for a telescope by integrating micro-lenses with optical waveguides and photonic structures fabricated on a silicon PIC. The MICRO device of the subject technology can be fabricated using standard lithographic fabrication techniques with minimal optical alignment required, and with no need for thermal control over a large optical area. The heterodyne measurements, applied in the MICRO device, make this device a narrow-band imager capable of velocity and magnetic field strength measurements.

Figure 2:
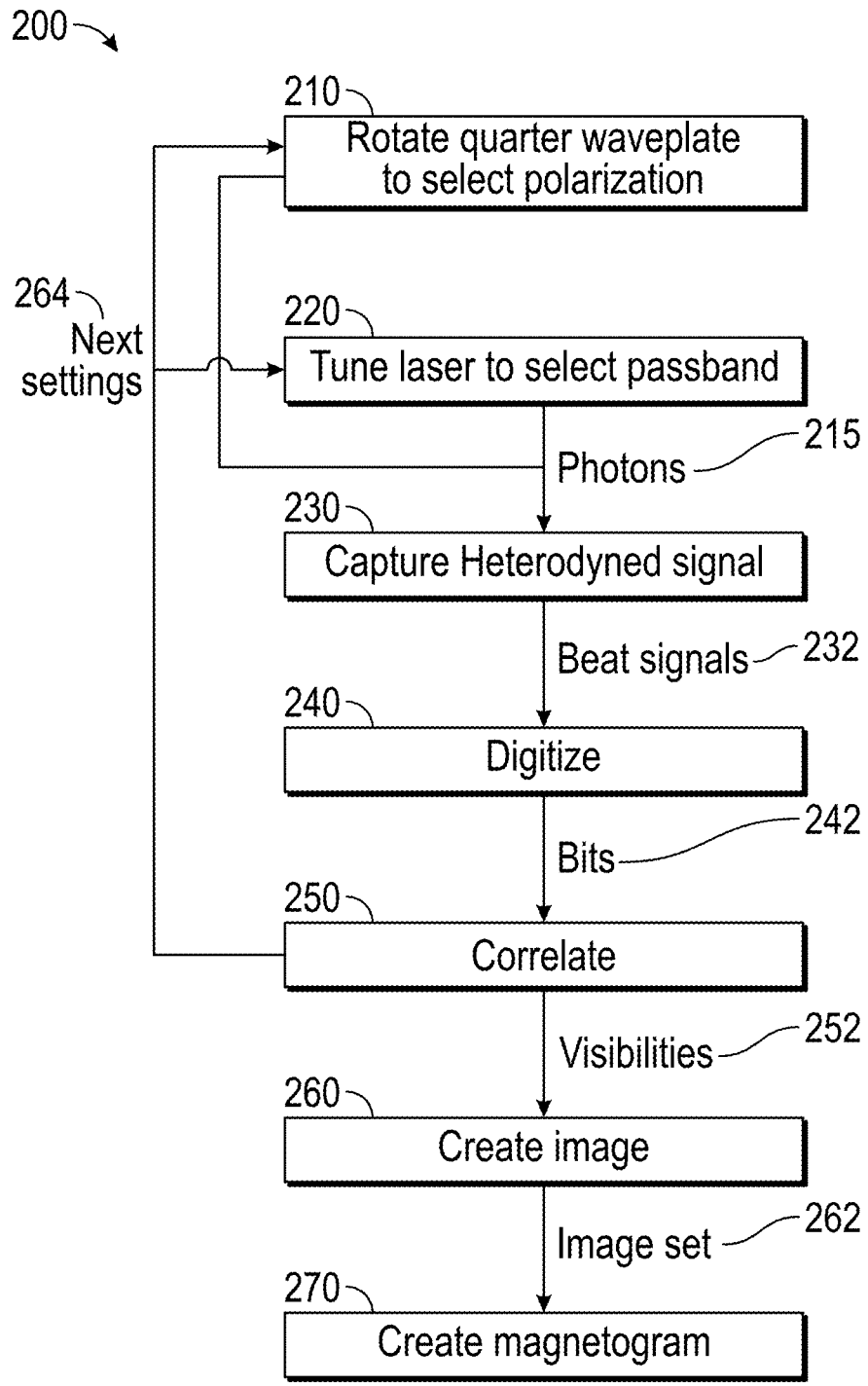
FIG. 2 is a flow diagram illustrating an example of a method of performing an imaging spectro-polarimetry, according to certain aspects of the disclosure.

FIG. 2 is a flow diagram illustrating an example of a method 200 of performing an imaging spectro-polarimetry, according to certain aspects of the disclosure. The method 200 starts at operation block 210, where the quarter waveplates of the polarizer 104 of FIG. 1 are rotated to select the desired polarizations (e.g., right and left CPs). At operation block 220, the tunable laser 110 of FIG. 1 is tuned to generate an optical LO signal at a desired wavelength. At operation block 230, photons 215, formed of the polarized light generated by the polarizer 104 and the optical LO signals generated by the tunable laser 110, are captured by the photodetector 126 of FIG. 1 to generate optical modulated signals (beat signals) 232. The optical modulated signals are converted to digital signals (bits) 242 by the ADC 128 of FIG. 1. In some implementations, measurements are performed using two polarizations. The measurements for the two polarizations can be performed by differential measurements, for instance, for Zeeman measurements. The digital signals 242 are converted, by the correlator module 152 of FIG. 1, to visibilities 252 that are used by the image reconstruction module 154 of FIG. 1. The visibilities for a set of polarizations and wavelengths can be determined by changing the settings 264, using the controller circuit 130 to control the tunable laser 110 and the polarizer 104. These image sets 262 are used to create a magnetogram, at operation block 270.

FIG. 3 is a schematic diagram illustrating examples of lenslet arrays 300 and a corresponding spatial frequency spectrum 310, according to certain aspects of the disclosure. The lenslet arrays 300 are part of a SPIDER device and include three linear arrays formed of lenslets 302. The lenslets 302 of adjacent linear arrays can form baselines, including redundant baselines 310 and 312. In some implementations, the number of and configuration of the linear arrays may be different than what is shown in FIG. 3. For example, linear arrays may be assembled in another configuration, such as a hexagonal array configuration or more linear arrays may be embedded to add additional triangular or other array configurations. The corresponding spatial frequency spectrum 310 is a 2-d spectrum showing data samples (signal magnitudes, also referred to as visibilities) at different spatial frequencies (U and V). The spatial frequency spectrum 310 has a uniform U-V coverage and depends on the array configuration.

FIG. 4 is a schematic diagram illustrating examples of lenslet arrays 400 and a corresponding spatial frequency spectrum 410, according to certain aspects of the disclosure. The lenslet arrays 400 is similar to the lenslet arrays 300 of FIG. 3, except that in each lenslet array two empty spaces 404 and 406 replace respective lenslets 402. The lenslet arrays 400 are part of a SPIDER device and include three linear arrays formed of lenslets 402. In some implementations, the number of and configuration of the linear arrays may be different than shown in FIG. 4. For example, linear arrays may be assembled in another configuration, such as a hexagonal array configuration or more linear arrays may be embedded to add additional triangular or other array configurations. The corresponding spatial frequency spectrum 410 is similar to the spatial frequency spectrum 310 of FIG. 3, except that the spatial frequency spectrum 410 is not uniform and includes twice as many data samples.

FIG. 5 is a schematic diagram illustrating examples of lenslet arrays 500 and a corresponding spatial frequency spectrum 510, according to certain aspects of the disclosure. The lenslet arrays 500 is similar to the lenslet arrays 400 of FIG. 4, except that in each lenslet array two empty spaces only one ending space 504 replaces the respective lenslets 502. The lenslet arrays 500 are part of a SPIDER device and include three linear arrays formed of lenslets 402. In some implementations, the number of and configuration of the linear arrays may be different than what is shown in FIG. 5. For example, linear arrays may be assembled in another configuration, such as a hexagonal array configuration, or more linear arrays may be embedded to add additional triangular or other array configurations. The corresponding spatial frequency spectrum 510 is similar to the spatial frequency spectrum 410 of FIG. 4, except that the spatial frequency spectrum 510 includes more data samples.

Figure 6:
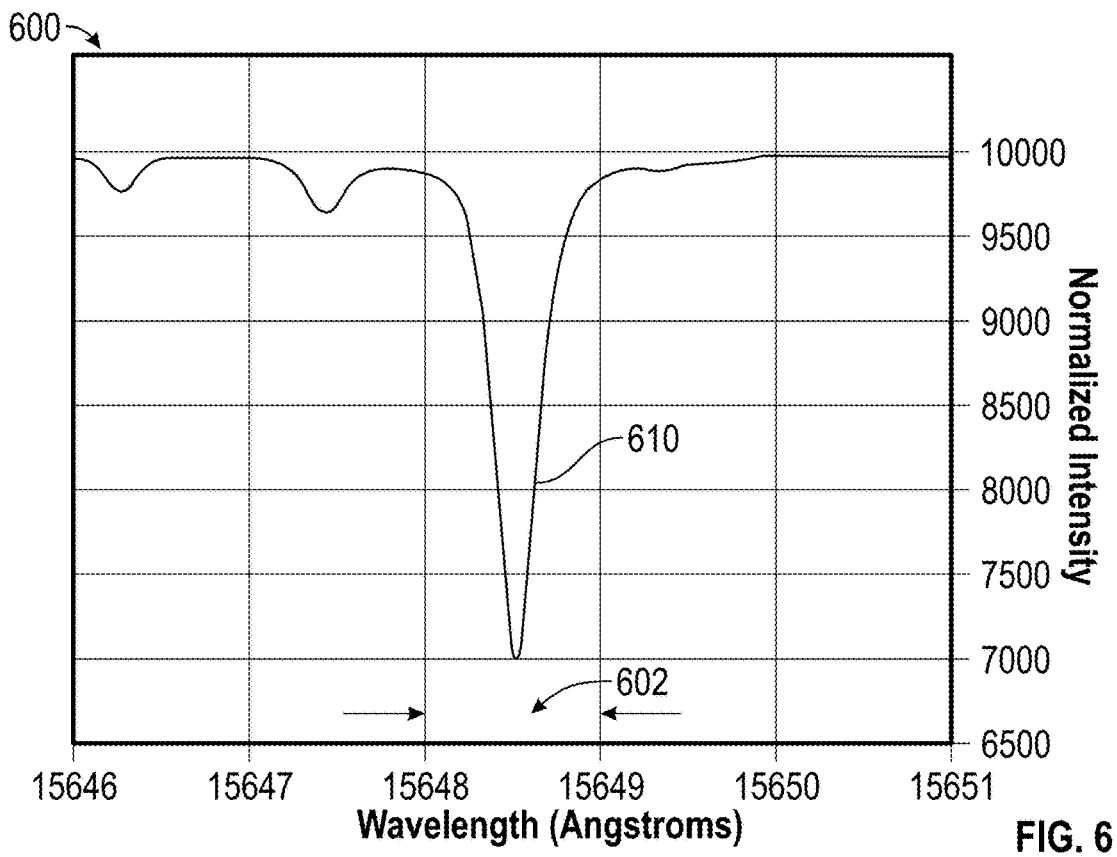
FIG. 6 is a chart illustrating an example magnetic field solar spectrum, according to certain aspects of the disclosure.

FIG. 6 is a chart illustrating an example of a solar spectrum 600, according to certain aspects of the disclosure. The solar spectrum 600 includes a plot depicting normalized image intensity versus wavelength in Angstroms (Å). The dip 610 with a wavelength width 602 (e.g., from 15448 Å to 15649 Å) is a characteristic of the solar spectrum line in the absence of a magnetic field.

Figure 7:
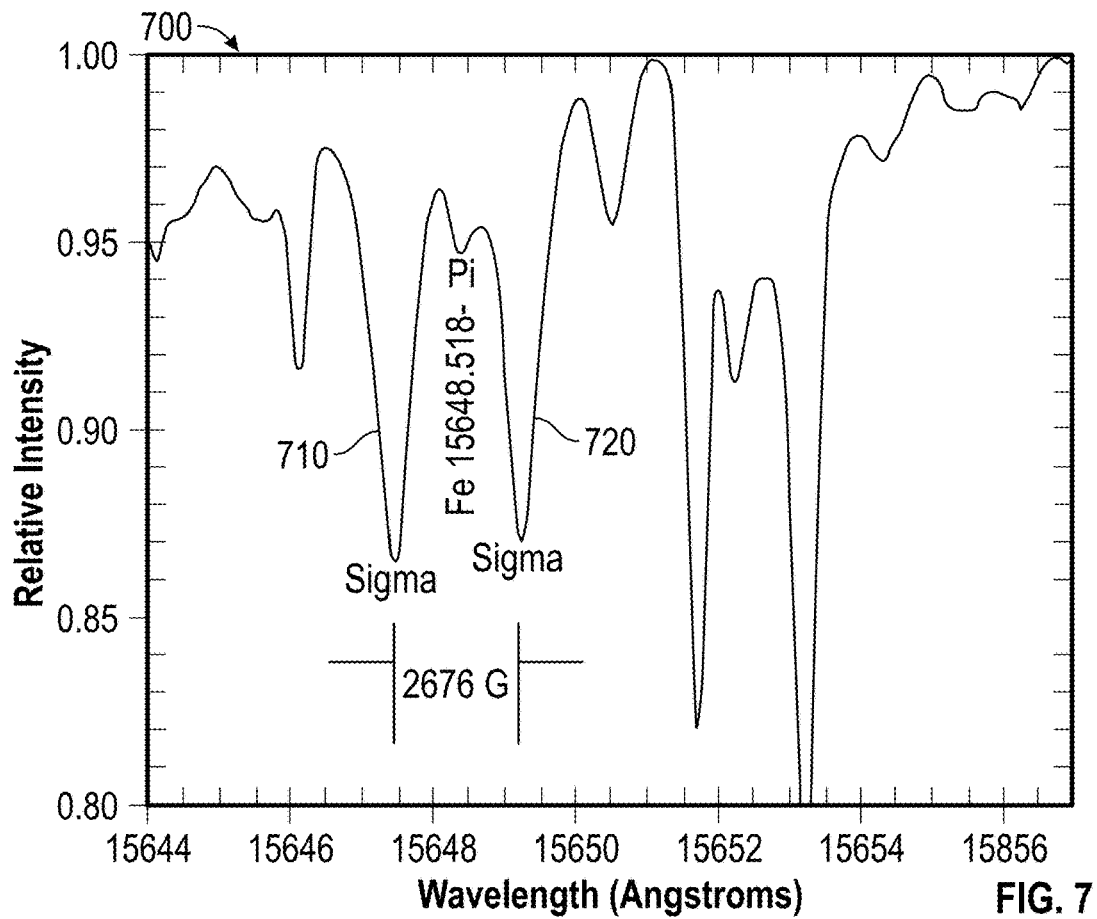
FIG. 7 is a chart illustrating an example magnetic field solar spectrum, according to certain aspects of the disclosure.
Figure 8:
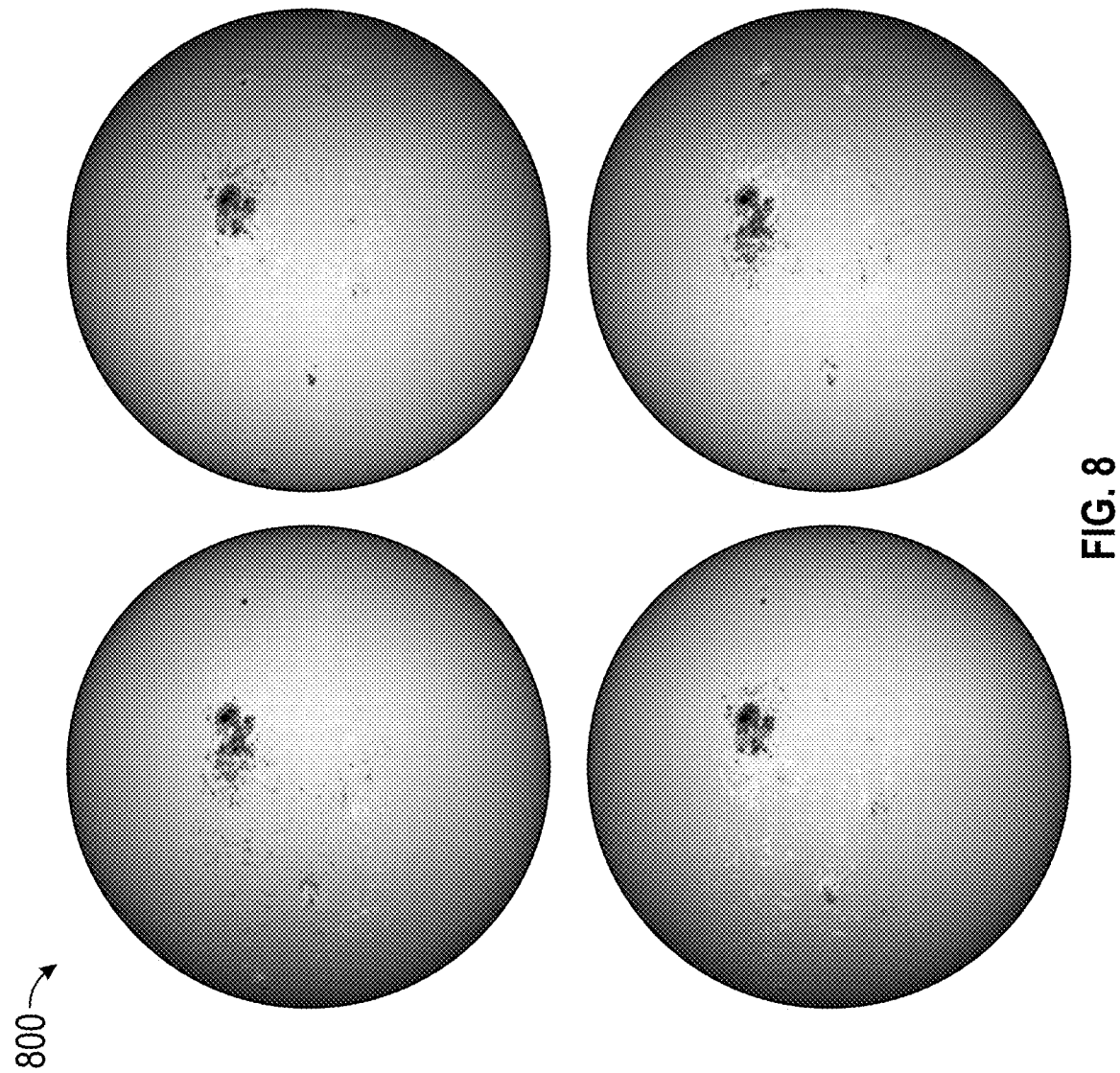
FIG. 8 is a schematic diagram illustrating an example magnetograph of the sun, according to certain aspects of the disclosure.

FIG. 7 is a chart illustrating an example of a solar spectrum 700, according to certain aspects of the disclosure. The solar spectrum 700 includes a plot depicting relative image intensity versus wavelength in Å. There are two dips 710 and 720 formed by the Zeeman splitting of the solar spectrum line with to two separate light polarizations (right-hand and left-hand CPs) moving in opposite spectral directions. This splitting is used in the MICRO device of the subject technology.

Figures 9, 10, 11:
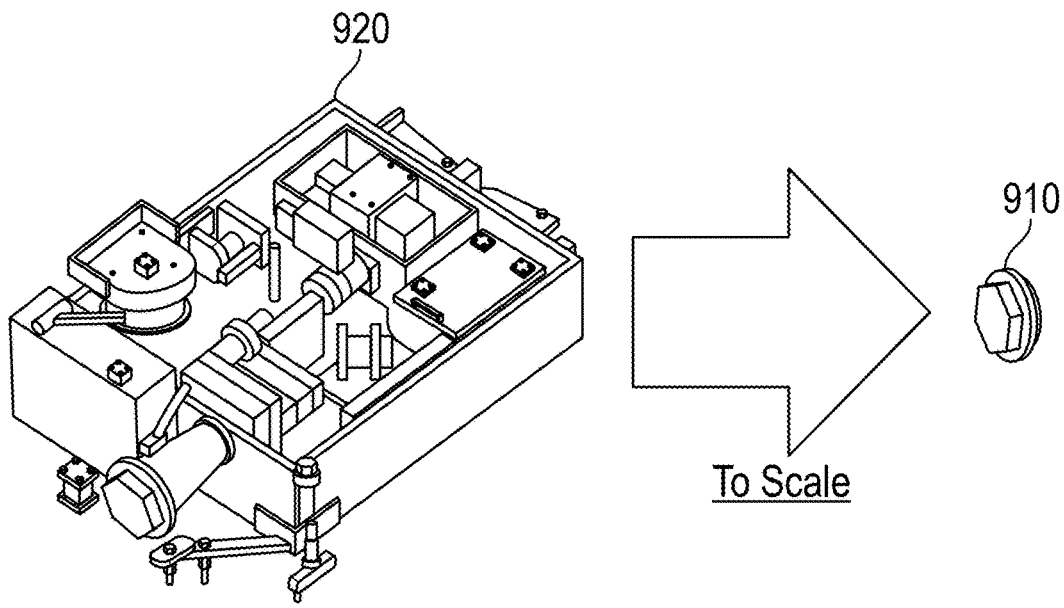
FIG. 9 is a schematic diagram illustrating a comparison between an example photonic integrated circuit (PIC) of the subject technology and a legacy magnetograph.
FIG. 10 is a table illustrating example parameters of the imaging spectro-polarimeter device of the subject technology.
FIG. 11 is a table illustrating example characteristics of the imaging spectro-polarimeter device of the subject technology in comparison with those of a legacy magnetograph.

FIG. 9 is a schematic diagram illustrating an example of a solar magnetograph 800, according to certain aspects of the disclosure. The example magnetograph 800 can be produced by the MICRO device of the subject technology, as described with respect FIG. 1. The solar magnetograph 800 and the one shown in FIG. 1 use polarizing photons from the sun to measure the Zeeman splitting, but solar magnetograph 800 uses traditional optical systems rather than photonics. The solar magnetograph 800 further utilizes heterodyne mixing of the polarized photons using optical LO signals.

FIG. 9 is a schematic diagram illustrating a comparison between an example PIC 910 of the subject technology and a legacy magnetograph 920. The PIC 910 of the subject technology has about 100 times less mass and about 1000 times less volume than the legacy magnetograph 920.

FIG. 10 is a table 1000 illustrating example parameters of the imaging spectro-polarimeter device of the subject technology. The table 1000 compares values of parameters, such as the spatial resolution, sensitivity and sampling frequency of the MICRO device of the subject technology with corresponding threshold values specified by the National Oceanic and Atmospheric Administration (NOAA). The date provided in table 10 shows that the MICRO device of the subject technology has sufficient sensitivity and speed to meet requirements expected by the NOAA specifications.

FIG. 11 is a table 1100 illustrating example characteristics of the imaging spectro-polarimeter device of the subject technology in comparison with those of a legacy magnetograph. The table 1100 compares values of parameters, such as aperture, volume and mass of the MICRO device of the subject technology with an existing compact magnetograph based on the helioseismic and magnetic imager design (e.g., reference magnetograph). The date provided in table 11 shows that the MICRO device of the subject technology has a larger aperture, about 1000 times less volume and about 100 times less mass than the reference magnetograph).

Figure 12:
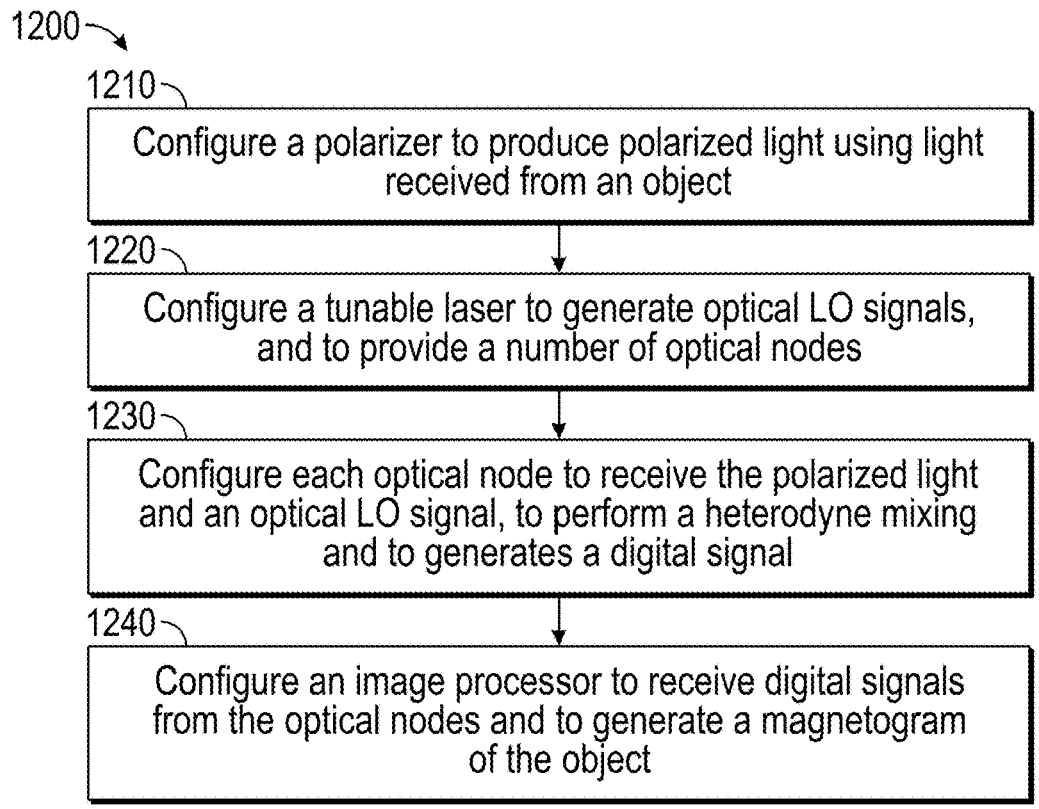
FIG. 12 is a flow diagram illustrating an example of a method of generating a magnetogram, according to certain aspects of the disclosure.

FIG. 12 is a flow diagram illustrating an example of a method 1200 of generating a magnetogram, according to certain aspects of the disclosure. The method 1200 includes configuring a polarizer (e.g., 104 of FIG. 1) to produce polarized light (including right and left circularly polarized light) (e.g., 106 of FIG. 1) using light received from an object (e.g., 102 of FIG. 1) (1210). The method also includes configuring a tunable laser (e.g., 110 of FIG. 1) to generate optical LO signals (e.g., 112 of FIG. 1), and providing a number of optical nodes (e.g., 120 of FIG. 1) (1220). Each optical node (e.g., 120-1 of FIG. 1) receives the polarized light and an optical LO signal, performs a heterodyne mixing and generates a digital signal (e.g., 140 of FIG. 1) (1230). The method further includes configuring an image processor (e.g., 150 of FIG. 1) to receive digital signals from the optical nodes and to generate a magnetogram (e.g., 155 of FIG. 1) of the object (1240). The polarizer, the tunable laser, the plurality of optical nodes and the image processor are implemented on a PIC.

Figure 13:
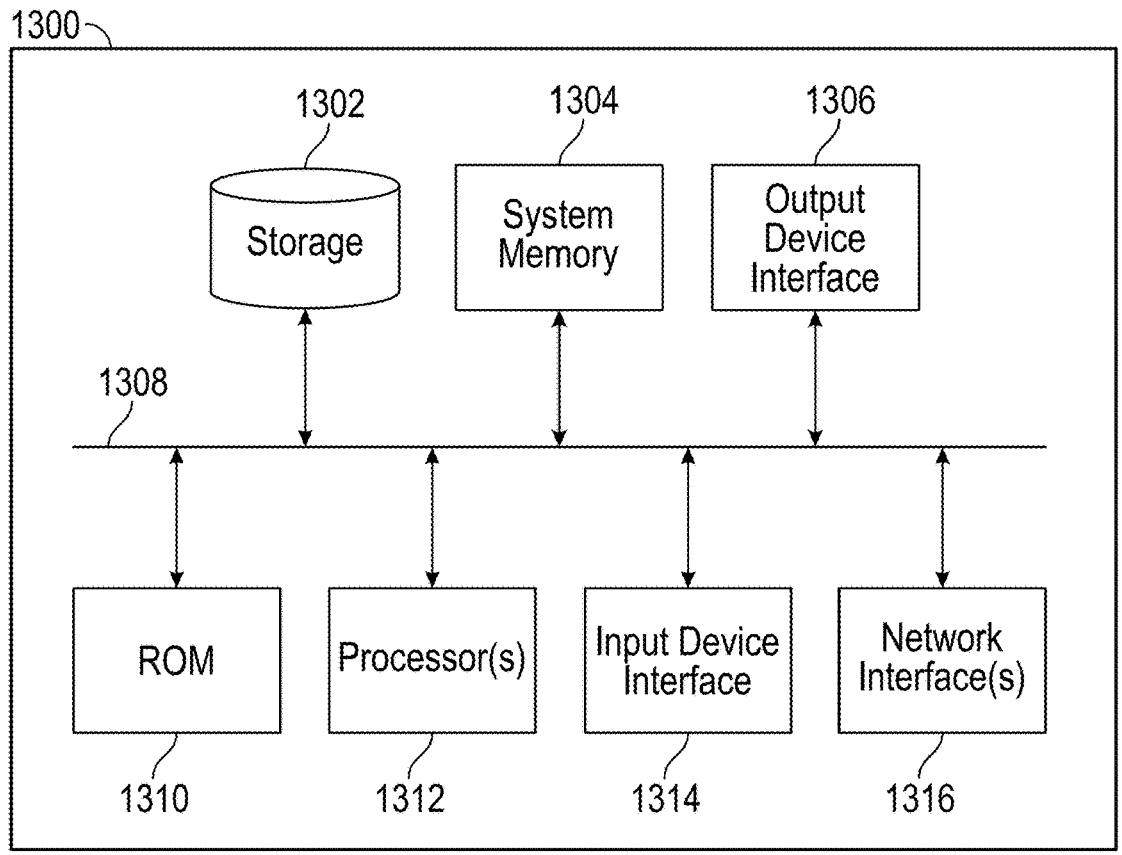
FIG. 13 conceptually illustrates an electronic system with which some aspects of the subject technology are implemented.

FIG. 13 conceptually illustrates an electronic system 1300 with which some aspects of the subject technology are implemented. Electronic system 1300, for example, can be a desktop computer, a laptop computer, a tablet computer, a server, a switch, a router, a base station, a receiver, a phone, a personal digital assistant, any device that can control and/or perform processing of data including aggregation of data, or generally any electronic device that transmits signals over a network. Such an electronic system includes various types of computer-readable media and interfaces for various other types of computer-readable media. Electronic system 1300 includes bus 1308, processing unit(s) 1312, system memory 1304, read-only memory (ROM) 1310, permanent storage device 1302, input device interface 1314, output device interface 1306, and network interface 1316, or subsets and variations thereof.

Bus 1308 collectively represents all system, peripheral, and chipset buses that communicatively connect the numerous internal devices of electronic system 1300. In one or more implementations, bus 1308 communicatively connects processing unit(s) 1312 with ROM 1310, system memory 1304, and permanent storage device 1302. From these various memory units, processing unit(s) 1312 retrieve(s) instructions to execute and data to process in order to execute the processes of the subject disclosure. The processing unit(s) 1312 can be a single processor or a multicore processor in different implementations.

ROM 1310 stores static data and instructions that are needed by processing unit(s) 1312 and other modules of the electronic system. Permanent storage device 1302, on the other hand, is a read-and-write memory device. This device is a nonvolatile memory unit that stores instructions and data even when electronic system 1300 is off. One or more implementations of the subject disclosure use a mass-storage device (such as a magnetic or optical disk and its corresponding disk drive) as permanent storage device 1302.

Other implementations use a removable storage device (such as a floppy disk or flash drive, and its corresponding disk drive) as permanent storage device 1302. Like permanent storage device 1302, system memory 1304 is a read-and-write memory device. However, unlike storage device 1302, system memory 1304 is a volatile read-and-write memory, such as random access memory (RAM). System memory 1304 stores any of the instructions and data that processing unit(s) 1312 need(s) at runtime. In one or more implementations, the processes of the subject disclosure, for example, the trained ROM, are stored in system memory 1304, permanent storage device 1302, and/or ROM 1310. From these various memory units, processing unit(s) 1312 retrieve(s) instructions to execute and data to process in order to execute the processes of one or more implementations. In one or more implementations, the processing unit(s) 1312 execute(s) the automatic processes of the subject technology, including performing at least partially control functionalities of the controller circuit 130 and the image processing functionalizes of the imager processing circuit 150 of FIG. 1.

Bus 1308 also connects to input and output device interfaces 1314 and 1306. Input device interface 1314 enables a user to communicate information and select commands to the electronic system. Input devices used with input device interface 1314 include, for example, alphanumeric keyboards and pointing devices (also called "cursor control devices"). Output device interface 1306 enables, for example, the display of images generated by electronic system 1300. Output devices used with output device interface 1306 include, for example, printers and display devices such as a liquid crystal display (LCD), a light emitting diode (LED) display, an organic light emitting diode (OLED) display, a flexible display, a flat-panel display, a solid-state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback, and input from the user can be received in any form, including acoustic, speech, or tactile input.

Finally, as shown in FIG. 13, bus 1308 also couples electronic system 1300 to a network (not shown) through network interface 1316. In this manner, the computer can be a part of a network of computers (such as a local area network (LAN), a wide area network (WAN), or an Intranet, or a network of networks, such as the Internet). Any or all components of electronic system 1300 can be used in conjunction with the subject disclosure.

In some aspects, the subject technology is related to methods and configuration for providing an imaging spectro-polarimeter using PIC. In some other aspects, the subject technology may be used in various markets, including, for example, and without limitation, sensor technology, signal processing and communication markets.

Those of skill in the art would appreciate that the various illustrative blocks, modules, elements, components, methods, and algorithms described herein may be implemented as electronic hardware, computer software or a combination of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks may be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single hardware and software product or packaged into multiple hardware and software products.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meanings unless otherwise explicitly and clearly defined by the patentee. If there is any conflict in the usage of a word or term in this specification and one or more patent or other documents that may be incorporated herein by reference, the definition that is consistent with this specification should be adopted.

What is claimed is:

1. An imaging spectro-polarimetry system, the system comprising:
    a polarizer configured to produce polarized light using light received from an object;
    a tunable laser configured to generate optical local oscillator (LO) signals;
    a plurality of optical nodes, each optical node of the plurality of optical nodes including an analog-to-digital converter (ADC) and being configured to:
        receive the polarized light and an optical LO signal; and
        perform a heterodyne mixing and generate a digital signal; and
    an image processing circuit configured to receive digital signals from the plurality of optical nodes and to generate a magnetogram of the object,
    wherein the plurality of optical nodes including ADCs are implemented on a photonic integrated circuit (PIC).

2. The system of claim 1, wherein each optical node of the plurality of optical nodes further comprises a lenslet, a second waveguide and a photodetector.

3. The system of claim 2, wherein the first waveguide is configured to receive the polarized light and the second waveguide is configured to receive the optical LO signal, and the photodetector is configured to receive output light from the first waveguide and the second waveguide, perform the heterodyne mixing and generate a modulated signal.

4. The system of claim 3, wherein the ADC is configured to receive the modulated signal and generate the digital signal.

5. The system of claim 1, wherein the plurality of optical nodes include lenslets of a lenslet array of a segmented planar imaging detector for electro-optic reconnaissance (SPIDER).

6. The system of claim 1, wherein the polarized light includes right and left circularly polarized light, and wherein the polarized light includes two linearly polarized light.

7. The system of claim 1, wherein the image processing circuit comprises a correlator module, an image reconstruction module, and a compression module.

8. The system of claim 7, further comprising a controller circuit configured to select an operation frequency of the tunable laser and to control timings of the correlator module, the image reconstruction module, and the compression module.

9. The system of claim 1, wherein the PIC has about two orders of magnitude less mass and about three orders of magnitude less volume than a reference magnetogram.

10. The system of claim 1, wherein the PIC further includes one or more of the polarizer, the tunable laser or the image processing circuit.

11. A method of generating a magnetogram, the method comprising:
configuring a polarizer to produce polarized light using light received from an object; the polarized light including right and left circularly polarized light;
configuring a tunable laser to generate optical local oscillator (LO) signals;
providing a plurality of optical nodes; and
configuring each optical node of the plurality of optical nodes to:
receive the polarized light and an optical LO signal; and
perform a heterodyne mixing and to generate a digital signal; and
configuring an image processor to receive digital signals from the plurality of optical nodes and to generate a magnetogram of the object,
wherein the plurality of optical nodes are implemented on a PIC.

12. The method of claim 11, wherein each optical node of the plurality of optical nodes comprises a lenslet, a first waveguide, a second waveguide, a photodetector and an analog-to-digital converter (ADC).

13. The method of claim 12, further comprising:
configuring the first waveguide to receive the polarized light;
configuring the second waveguide to receive the optical LO signal; and
configuring the photodetector to receive output light from the first waveguide and the second waveguide, perform the heterodyne mixing and generate a modulated signal.

14. The method of claim 13, further comprising configuring the ADC to receive the modulated signal and generate the digital signal.

15. The method of claim 11, wherein the plurality of optical nodes includes a lenslet array of a segmented planar imaging detector for electro-optic reconnaissance (SPIDER) and wherein the lenslet array comprises a triangular configuration including linear lenslet arrays.

16. The method of claim 11, wherein the image processor comprises a correlator module, an image reconstruction module, and a compression module, and the method further comprises configuring a controller circuit to select an operation frequency of the tunable laser and control timings of the correlator module, the image reconstruction module, and the compression module.

17. An imaging spectro-polarimetry PIC, the PIC comprising:
a polarizer configured to produce polarized light using light received from an object, the polarized light including right and left circularly polarized light;
a tunable laser configured to generate optical local oscillator (LO) signals; and
a plurality of optical nodes, each optical node of the plurality of optical nodes being configured to:
receive the polarized light from the polarizer and an optical LO signal from the tunable laser; and
perform a heterodyne mixing and generate a digital signal; and
an image processing circuit configured to receive digital signals from the plurality of optical nodes and generate a magnetogram of the object.

18. The PIC of claim 17, wherein each optical node of the plurality of optical nodes comprises a lenslet, a first waveguide, a second waveguide, a photodetector and an analog-to-digital converter (ADC).

19. The PIC of claim 18, wherein the first waveguide is configured to receive the polarized light and the second waveguide is configured to receive the optical LO signal, and the photodetector is configured to receive output light from the first waveguide and the second waveguide and to perform the heterodyne mixing and generate a modulated signal, and wherein the ADC is configured to receive the modulated signal and to generate the digital signal.

20. The PIC of claim 17, wherein the polarized light includes two linearly polarized light.

* * * * *